United States Patent
Olof-Ors et al.

(10) Patent No.: US 10,290,055 B2
(45) Date of Patent: May 14, 2019

(54) ENCODED SHORT MESSAGE SERVICE TEXT MESSAGING SYSTEMS AND METHODS

(75) Inventors: Mans Olof-Ors, London (GB); David Lehr, San Jose, CA (US)

(73) Assignee: Refinitiv US Organization LLC, New York, NY (US)

(*) Notice: Subject to any disclaimer, the term of this patent is extended or adjusted under 35 U.S.C. 154(b) by 1223 days.

(21) Appl. No.: 11/408,804

(22) Filed: Apr. 21, 2006

(65) Prior Publication Data
US 2007/0250432 A1    Oct. 25, 2007

(51) Int. Cl.
| | |
|---|---|
| G06Q 40/04 | (2012.01) |
| G06Q 30/00 | (2012.01) |
| H04L 12/58 | (2006.01) |
| H04L 29/08 | (2006.01) |

(52) U.S. Cl.
CPC ........... *G06Q 40/04* (2013.01); *G06Q 30/00* (2013.01); *H04L 51/38* (2013.01); *H04L 67/04* (2013.01); *H04L 67/18* (2013.01); *H04L 67/306* (2013.01); *H04L 2209/043* (2013.01); *H04L 2209/34* (2013.01)

(58) Field of Classification Search
CPC ......... H04W 4/14; H04W 4/12; G06F 19/328; H04L 2209/34; H04L 2209/043; G06Q 40/04

See application file for complete search history.

(56) References Cited

U.S. PATENT DOCUMENTS

| | | | | |
|---|---|---|---|---|
| 5,530,794 | A | * | 6/1996 | Luebbert .................... 715/210 |
| 5,634,084 | A | * | 5/1997 | Malsheen et al. ........... 704/260 |
| 5,924,082 | A | | 7/1999 | Silverman et al. |
| 6,301,484 | B1 | * | 10/2001 | Rogers et al. ............... 455/466 |
| 6,625,460 | B1 | | 9/2003 | Patil |
| 6,920,331 | B1 | * | 7/2005 | Sim et al. .................... 455/466 |
| 7,263,102 | B2 | * | 8/2007 | Kreiner et al. .............. 370/401 |
| 7,620,407 | B1 | * | 11/2009 | Donald .............. H04L 12/5885 455/466 |
| 2001/0037393 | A1 | * | 11/2001 | Park et al. .................... 709/228 |
| 2002/0168986 | A1 | * | 11/2002 | Lau et al. .................... 455/456 |
| 2003/0069830 | A1 | * | 4/2003 | Morano et al. ................ 705/37 |

(Continued)

FOREIGN PATENT DOCUMENTS

| | | | |
|---|---|---|---|
| EP | 1039768 A2 | * | 9/2000 |
| EP | 1326189 A3 | * | 11/2002 ............. G06F 17/60 |

(Continued)

OTHER PUBLICATIONS

United States—US Publication title: Farm Industry News. Minneapolis: Mar 2006. vol. 39, Iss. 4; p. 14, 3 pgs ; Author(s): David Hest; ISSN: 08928312; ProQuest document ID: 1014601531 ; URL : http://proquest.umi.com/pqdweb?did=1014601531&sid=3&Fmt=4&clientId=19649&RQT=309&VName=PQD.*

(Continued)

*Primary Examiner* — Eric T Wong
*Assistant Examiner* — Mary M Gregg
(74) *Attorney, Agent, or Firm* — Norton Rose Fulbright US LLP

(57) ABSTRACT

According to some embodiments, systems, methods, apparatus, computer program code and means are provided to encode data in a text message and to send the text message to a mobile device associated with a user.

20 Claims, 12 Drawing Sheets

(56) References Cited

U.S. PATENT DOCUMENTS

| | | | |
|---|---|---|---|
| 2004/0068458 A1* | 4/2004 | Russo | 705/36 |
| 2004/0203939 A1* | 10/2004 | Li et al. | 455/466 |
| 2004/0249779 A1* | 12/2004 | Nauck et al. | 706/47 |
| 2005/0033582 A1* | 2/2005 | Gadd et al. | 704/277 |
| 2005/0111644 A1* | 5/2005 | Edwards | 379/142.01 |
| 2005/0132016 A1* | 6/2005 | Boone | 709/207 |
| 2005/0169240 A1* | 8/2005 | Bal | 370/351 |
| 2005/0177419 A1* | 8/2005 | Choi et al. | 705/14 |
| 2005/0180370 A1* | 8/2005 | Andersen | H04L 12/5835 370/338 |
| 2005/0240391 A1* | 10/2005 | Lekutai | 704/2 |
| 2006/0040678 A1* | 2/2006 | Kwon | 455/456.3 |
| 2006/0126620 A1* | 6/2006 | Bonar | G06F 8/35 370/389 |
| 2006/0155693 A1* | 7/2006 | Chowdhury et al. | 707/4 |
| 2006/0155698 A1* | 7/2006 | Vayssiere | 707/6 |
| 2006/0234631 A1* | 10/2006 | Dieguez | 455/41.2 |
| 2006/0293065 A1* | 12/2006 | Chew et al. | 455/456.3 |
| 2007/0130155 A1* | 6/2007 | Alperin et al. | 707/10 |
| 2007/0191032 A1* | 8/2007 | Doffman | 455/466 |
| 2007/0207798 A1* | 9/2007 | Talozi et al. | 455/423 |
| 2008/0268884 A1* | 10/2008 | Lee | 455/466 |

FOREIGN PATENT DOCUMENTS

| | | | | |
|---|---|---|---|---|
| EP | 1262931 | A1 * | 12/2002 | |
| EP | 1326189 | A2 * | 7/2003 | G06Q 10/107 |
| GB | 2376841 | A * | 12/2002 | |
| WO | WO 9732439 | A2 * | 9/1997 | |
| WO | WO 9834422 | A2 * | 8/1998 | |
| WO | WO 0103456 | A1 * | 1/2001 | |

OTHER PUBLICATIONS

Corn Products International Rings NYSE Closing Bell(SM) Today. (Feb. 6). PR Newswire,1. Retrieved Aug. 4, 2009, from Business Dateline. (Document ID: 981756591).*

Mike Clendenin. (Nov. 2001). Winbond voice SoC becoming a natural. Electronic Engineering Times,(1192), 51. Retrieved Jan. 12, 2010, from ProQuest Computing. (Document ID: 92514275).*

Word Based Data Compression Schemes Yeheskel Bar-Ness and Christopher Peckham The Center for Communication and Signal Processing Research Department of Electrical Engineering (Year: 1989).*

Quotestream™—"Quotestream Wireless Frequently Asked Questions". [Retrieved Mar. 8, 2006]. Retrieved from Internet: URL: http://www.quotestream.com/wirelessinfo.php?qm_page=42029@usingq . . . , 3pgs.

Mobile Streams' Press, "The Case for Developing SMS and WAP", Business Communications Review International, Nov. 30, 2000. [Retrieved Mar. 8, 2006]. Retrieved from Internet: URL: http://www.mobilesms.com/show_press.asp?link=121 , 2pgs.

GenieTexter Tutorial. [Retrieved Mar. 8, 2006]. Retrieved from Internet: URL: http://www.genietexter.co.uk/tutorial.php , 6pgs.

FT.com/Site Services/FT Mobile/SMS, "SMS News Tracking", [Retrieved Mar. 8, 2006]. Retrieved from Internet: URL: http://news.ft.com/siteservices/ftmobile/sms , 2pgs.

"Register SMS Phone", Ipipi.com, [Retrieved Mar. 8, 2006]. Retrieved from Internet: URL: http://www.ipipi.com/help/helpsms.htm , 2pgs.

"Short message service", from Wikipedia, the free encyclopedia, [Retrieved Mar. 8, 2006]. Retrieved from Internet: URL: http://en.wikipedia.org/wiki/Short_message_service , 7pgs.

Indian Examination Report issued in corresponding Indian Patent Application No. 2356/DEL/2006 dated Oct. 21, 2011.

* cited by examiner

200

PEPPER MCX 3212; SUGAR MCX 1121
　　　　　　　　　　　　　　　201

| Exchange Name | Exchange Short Form | Commodity Name | Short Form |
|---|---|---|---|
| MCX | M | Pepper | P |
|  |  | Soyameal | Y |
|  |  | Wheat | W |
|  |  | Basmati Rice | R |
|  |  | Maize | M |
|  |  | Sugar | S |

ENCODED SHORT MESSAGE SERVICE TEXT MESSAGING SYSTEMS AND METHODS

BACKGROUND

Advances in communications technology have changed the way many markets work. For example, in many areas, wide-spread availability and access to the Internet has benefited buyers and sellers of goods and services by providing easy access to pricing and market information. Unfortunately, this ready access to information is not available to everyone. For example (using an example that will be carried throughout this application), many sellers and producers of agricultural products do not have up to date market information.

Over half of the world's population derives their primary income from farming. The percentage is highest in the developing world. For example, the Indian economy is vast, having a population of over one billion, a resource-rich land mass, and one of the world's largest manufacturing sectors. The diverse Indian economy encompasses both traditional village farming and modern agriculture. About 24% of India's gross domestic product is derived from the agricultural sector that employs about 66% of the population. However, the overall literacy rate of India's population is only 65%. The land area under cultivation has risen steadily and is now greater than half of the nation's land area. Major crops include rice, wheat, cereals, pulses, food grains, oilseeds (soyabean, groundnut, sunflower, mustard, and rapeseed), sugarcane/sugar, cotton, jute, and fruits.

Many farmers, even in extreme rural locations, now have access to cellular or portable telephones (generally referred to herein as "mobile telephones" or "mobile phones"). For example, the mobile phone market in India is the world's fastest growing mobile market, having currently over 76 million mobile users. Thanks to intense competition, consumers enjoy low call rates and access to networks. For example, India enjoys the world's lowest call cost, with rates at less than two (2) U.S. cents per minute.

Most farmers lack access to foreign markets, financial services, and news regarding commodity, weather, and political developments. The lack of access to this information can stifle growth in the agricultural sectors of developing countries like India. Since farmers often lack relevant and up-to-date information when bringing their produce to market, middlemen who typically have better knowledge of agricultural commodity pricing information, weather information, and news may be able to take advantage of the farmers lack of access to information.

The increasingly large growth of mobile phone usage in rural areas has dramatically removed one of the biggest obstacles of the agricultural community to access the information they need—connectivity.

BRIEF DESCRIPTION OF THE DRAWINGS

FIG. 2 is a block diagram of a method according to some embodiments.

DETAILED DESCRIPTION

According to some embodiments, systems, methods, computer program code, and means are provided to encode data in a text message and send the text message to a mobile device associated with a user.

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Many people do not use the Internet or computers and, instead, rely on mobile devices as their primary form of communication. The ability to deliver information anytime and anywhere is becoming increasingly critical. By delivering relevant commodity information, local and international news, and weather related information, a more level playing field may be obtained for all market participants.

By using encoded short message service ("SMS") text messages information may be delivered to mobile devices including, but not limited to, mobile phones, personal data assistants, and handheld personal computers. Certain SMS messages may be limited to 160 characters, which may limit the amount of information that may be sent within an SMS text message. However, encoding SMS messages may allow significantly more information to be sent within the 160-character limit. In some embodiments, Unstructured Supplementary Service Data ("USSD") messaging may be used.

For illustrative purposes, and to aid in understanding features of the invention, an example will now be introduced. This example will be carried through the detailed description and this example is not intended to limit the scope of the invention.

In the example, a farmer in a rural area grows sugarcane and pepper. The farmer would like to be updated on an regular (e.g., hourly basis) of current market prices, weather forecasts, and any news that may affect his sugarcane and pepper crops. The farmer has a JAVA enabled mobile phone and wants to receive this information on his mobile phone. However, this farmer does not have a data subscription so a web based solution or wireless application protocol ("WAP") solution may not possible.

Figure 1:
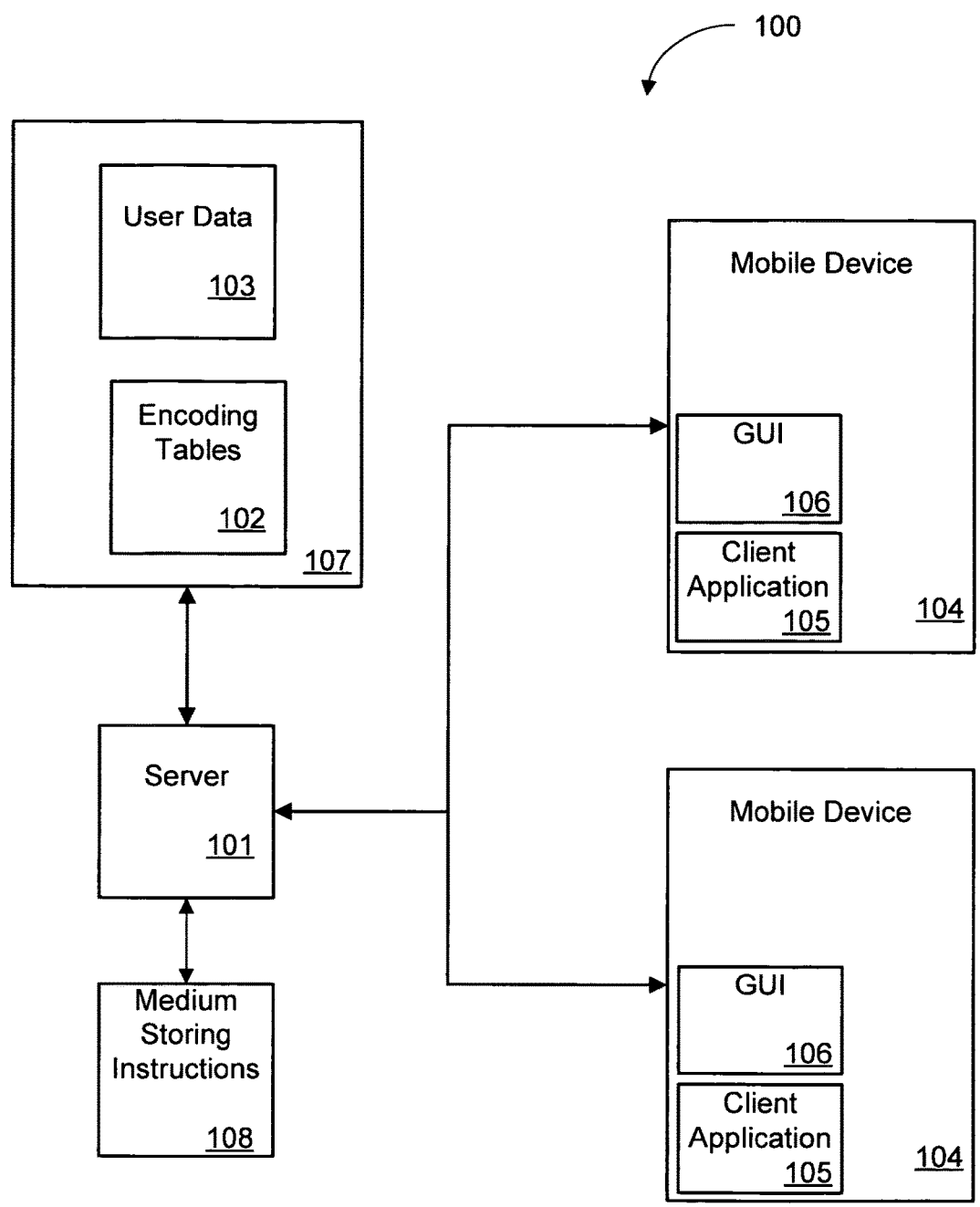
FIG. 1 is a block diagram of a system according to some embodiments.

Referring now to FIG. 1, an embodiment of a system 100 is shown. A server 101 contains a processor and the server 101 may be any network server or personal computer. The processor may execute instructions stored in a medium 108. The medium 108 may be, but is not limited to, a disk drive, firmware, or read only memory. The server 101 may access a database 107. The database 107 may contain tables that include user data 103 and encoding tables 102.

The server 101 may communicate with one or more mobile devices 104 through a variety of means such as, but not limited to, a wireless network, a telecom tower, and a satellite. Each mobile device 104 is associated with a user and may contain a graphical user interface ("GUI") 106 and a client application 105.

The client application 105 may decode the encoded text message and display the data through the GUI 106. The data may be displayed in the form of graphical icons. Displaying the data in the form of graphical icons may provide illiterate people access to the same data as literate people and may also provide people who speak different languages or dialects access to the same information without necessitating a translation. The GUI 106 may display textual descriptions as well as graphical icons. In some embodiments, where USSD messaging may be implemented, the client application 105 may initiate a USSD session with the server 101. The client application 105 may act as a front end to continue the USSD session.

Using the example of the sugarcane and pepper farmer, the farmer's mobile phone decodes a message using a client application loaded on his mobile phone, and the mobile phone displays the icons resembling his crops that in this example are sugarcane and pepper. Next to the icon resembling sugarcane and the icon resembling pepper may be the words "sugarcane" and "pepper" respectively (e.g., in the farmer's preferred language). The farmer can select either of the icons to bring up a display screen that shows available and/or requested market prices for each crop. One or more market prices will be displayed for each crop. The farmer may also see icons and/or text representing weather specific conditions for his local area such as sunny, cloudy, raining, snowing, or thunderstorms.

The data sent by the server 101 is selected based on preference information associated with the user. The preference information may contain, but is not limited to, one or more commodity trading preferences, local and/or international news, weather information, and a location of the user.

Examples of a commodity trading preference may include an indicated commodity, an indicated exchange, and a market price of the commodity as determined by the indicated exchange. Indications of multiple commodities and/or indications of multiple exchanges or combinations thereof may also be used as a commodity trading preference. For example, a trading preference may include an indication of a first commodity, an indication of a second commodity, a market price for the first commodity and a market price for the second commodity where the market prices are determined by the same exchange. Another example of a trading preference may include an indication of a first commodity, an indication of a second commodity, a market price for the first commodity and a market price for the second commodity, where the market prices are determined by different exchanges.

The location of the user, for use as preference information, may be determined through a variety of means. Some examples of determining the location of the user are triangulating signals from a plurality of telecom towers, locating the latitude and longitude of the user by a global positioning system, analyzing a subscription pattern of weather and market content, and examining the user's profile. The user profile may contain, but is not limited to, an address, a mobile phone number, and an area code.

Again using the example of the sugarcane and pepper farmer, if the farmer's user profile had not been completed and thus his location is unknown to the system, the farmer's location may be determined by other means so that the system is able to determine which relevant information to send (e.g. a weather forecast for the farmer's specific geographic location). In some embodiments, the system may determine the location of the farmer by using a global positioning system "GPS" if the farmer's mobile phone is GPS enabled.

The data sent in a text message, as determined by the preference information, is encoded by the use of encoding tables 102. In the present embodiment, the encoding tables 102 are stored in the database 107. However, in other embodiments, the coding tables may be stored in read only memory, software, firmware, or any other storage mechanism.

The encoded data may contain, but is not limited to, an indication of a commodity in a short form, a time stamp indicating information date and time, an indication of an exchange in a short form, a market price of the commodity, weather information in a short form, and news. In some embodiments the market price is separated from either the news or weather information by a delimiter. The delimiter may be, but is not limited to, a semicolon, a colon, a comma, a space, and a caret. Those skilled in the art will appreciate that other types of data may be encoded, transmitted, and un-encoded using features of embodiments of the present invention. For example, data and information related to voting, betting, train times, reality television programs, sports results, or the like, may be encoded, transmitted, and un-encoded with features of the present invention.

Again referring to the example of the sugarcane and pepper farmer, the farmer's mobile phone will receive a short form of sugarcane, a short form of pepper, and short forms of the various exchanges. This allows more room in the text message for weather information and news.

In the current embodiment the encoded data is pushed to the mobile device, however, in other embodiments the encoded data may be pulled from the server based on a request from the mobile device.

In another embodiment, a mobile device 104 may send an update to the server 101 though a text message. The text message may be encoded or may be clear text. The update may be, but is not limited to, an update to a data subscription profile or to the preference information. In yet another embodiment, a mobile device 104 may send an encoded text message to another mobile device 104.

Referring now to FIG. 2, an embodiment of a method 200 is shown. At 201, an example of an un-encoded text message is shown. The un-encoded text message displays PEPPER which may be an indication of a first commodity, MCX which may be an indication of an exchange, 3212 which may be a market price of the first commodity, SUGARCANE which may be an indication of a second commodity, MCX which may be an indication of the exchange, and 1121 which may be a market price of the second commodity. The market price of the first commodity may be separated from the indication of the second commodity by a delimiter such as a semicolon.

At 202, an un-encoded text message is encoded using an encoding table. The encoding table shown is an example of an encoding table that lists a short form for each commodity available on an exchange. Examples of commodities that may be available are sugarcane, wheat, soybeans, rice, maize, tea, coffee, and pepper. The example-encoding table at 202 lists the Multi Commodity Exchange of India ("MCX") with a short form of M and the available commodities such as Pepper and Sugarcane with short forms P and S respectively. Encoding table 202 may list other exchanges, for example, the London International Financial Futures Exchange ("LIFFE"), the Chicago Board of Trade ("CBOT"), and the New York Board of Trade ("NYBOT"). In the current example, the short forms are illustrated as single character short forms. However, short forms may be multiple character short forms.

Using the example un-encoded message at 201, the encoding table would encode the example un-encoded message as follows: PEPPER may be replaced with a P, the first MCX may be replaced with an M, and the P, M, and market price may be concatenated forming a first piece of data. SUGARCANE may be replaced with an S, the second MCX may be replaced with an M and the S, M, and market price may be concatenated forming a second piece of data. The first piece of data may be concatenated with the second piece thus removing all spaces from the text message. The removal of spaces may allow for more data to be encoded in the text message.

At 203, an encoded text message is shown. An example of the encoded text message may be the un-encoded message used at 201 encoded by the encoding table at 202. In the present example, the encoded text message displays P which may be an indication of a first commodity, M which may be an indication of an exchange, 3212 which may be a market price of the first commodity, S which may be an indication of a second commodity, M which may be an indication of the exchange, and 1121 which may be a market price of the second commodity. The price of the first commodity may not be separated from the indication of the second commodity. The encoded message may consist of a shorter string of alphanumeric characters than the un-encoded message.

Again using the example of the sugarcane and pepper farmer, the farmer's mobile phone will receive a data stream of PM3212SM1121 and this data stream will be parsed and decoded by a client application stored on the mobile phone. The client application stored on the mobile phone will display the P as a pepper icon and the S as a sugarcane icon. If the pepper icon is selected, the client application will display the market price for the pepper with the indication of the exchange. In this example if the pepper icon was selected the display would show the exchange MCX and the market price of 3212.

Figure 2A:
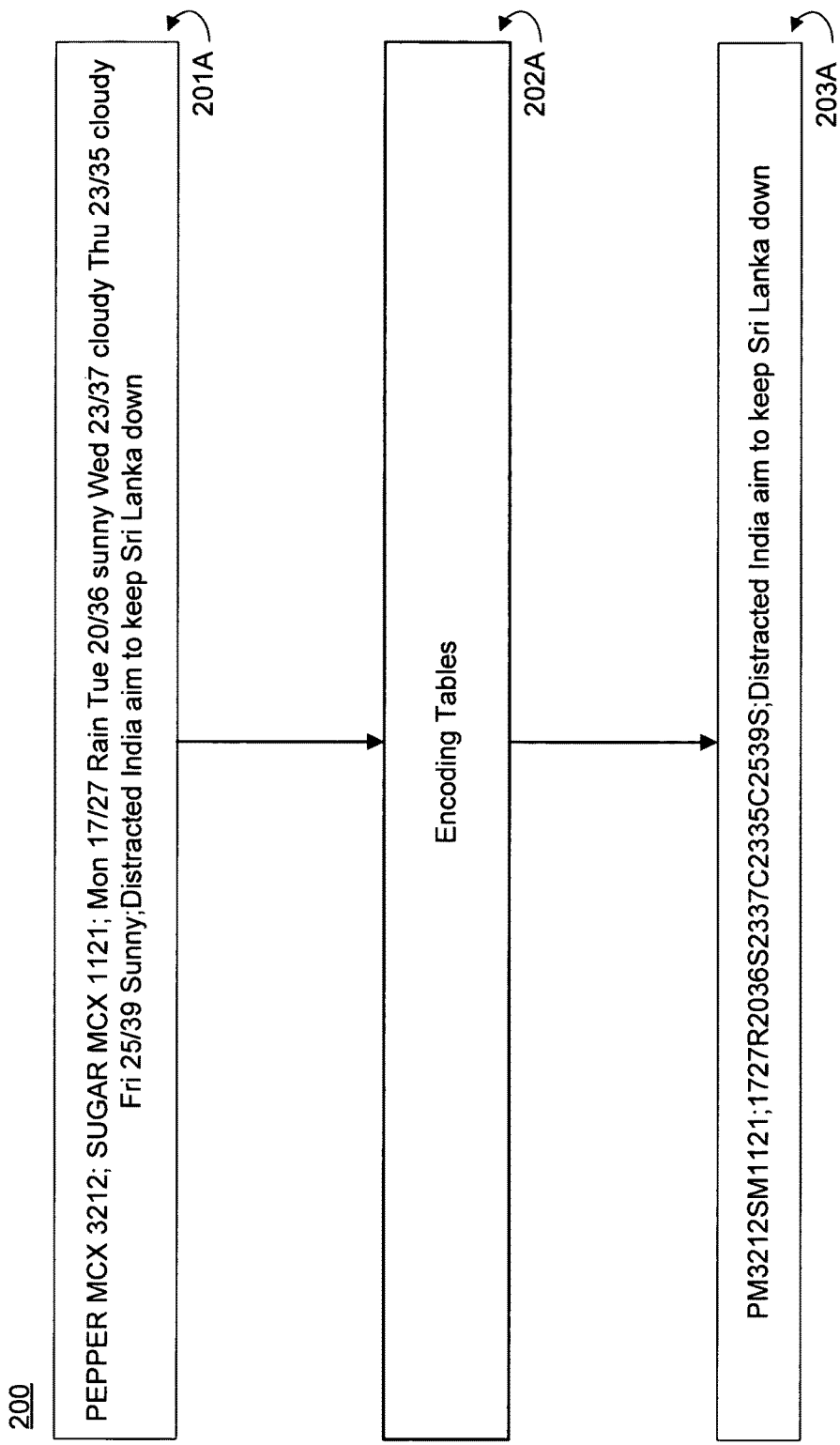
FIG. 2A is a block diagram of a method according to some embodiments.

Referring now to FIG. 2A, a second example of a method 200 is shown. At 201A, a second embodiment of an un-encoded text message is shown. Un-encoded text message 201A includes the same data as un-encoded text message 201 and further includes weather information and news. The weather information may be separated from the commodity information by a delimiter, such as a semicolon and also be separated from the news by a delimiter, such as a semicolon.

At 202A, a plurality of encoding tables are used to encode the un-encoded text message 201A The plurality of encoding tables may include, but are not limited to, tables based on an exchange, available commodities, weather information, and news. In the present example, the encoding table used in FIG. 2 may be used to encode the commodity data and another encoding table may used to encode weather information. Weather information may also be encoded in short forms. For example, a weather forecast of Sunny, Rainy, or Cloudy may have short forms S, R, or C respectively.

At 203A, an example of an encoded text message is shown. In the present example, a semicolon is used as a delimiter between the market price and the weather information. The encoded text message may be an example of encoding the un-encoded text message by the encoding table at 202A. The encoded text message displays P which may be an indication of a first commodity, M which may be an indication of an exchange, 3212 which may be a market price of the first commodity, S which may be an indication of a second commodity, M which may be an indication of the exchange, and 1121 which may be a market price of the second commodity. The encoded text message may separate the commodity data from the encoded weather information by a delimiter such as a semicolon.

The encoded weather information 1727R2036S2337C2335C2539S may be a concatenation of high and low temperatures and weather forecasts. The removal of spaces may allow for more data to be encoded in the text message and thus the encoded message may consist of a shorter string of alphanumeric characters than the un-encoded message.

Using the example of the sugarcane and pepper farmer, the farmer's mobile phone will receive a data stream of 1727R2036S2337C2335C2539S and this data stream will be parsed and decoded by a client application stored on the mobile phone. The client application stored on the mobile phone will display the R as a rain icon, the S as a sunny icon, and the C as a cloudy icon. The four digits preceding each letter represent the low/high temperature with that day's forecast. Since this example data stream includes weather forecasts for a period of five days, the mobile phone display would show all five days worth of forecast icons and the corresponding low/high temperatures.

Figure 3:
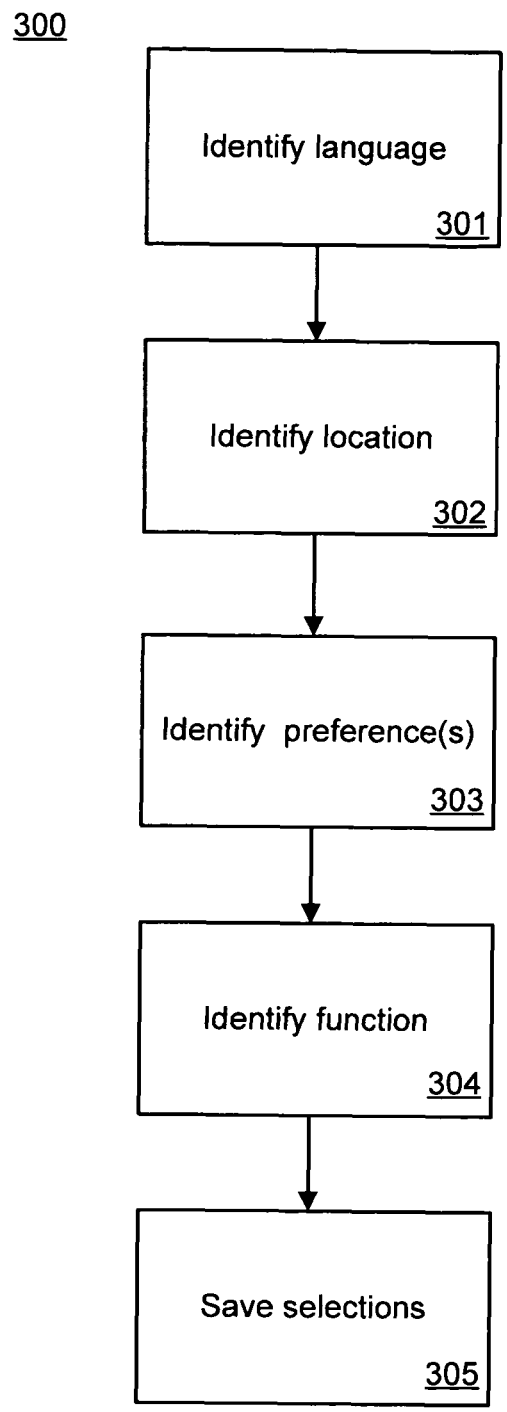
FIG. 3 is a block diagram of a method according to some embodiments.

Referring now to FIG. 3, an embodiment of a method 300 is shown. An example of the method may be configuring a user profile. At 301, a user may connect with a central system and identify a language spoken or read by the user. At 302, the user may identify a location. The location may be a current location or future location. At 303, the user may enter preference information. The preference information may contain, but is not limited to, one or more commodity trading preferences, local and/or international news, weather information, and a location of the user.

Examples of a commodity trading preference may include an indicated commodity, an indicated exchange, and a market price of the commodity as determined by the indicated exchange. Indications of multiple commodities and/or indications of multiple exchanges or combinations thereof may also be used as a commodity trading preference. For example, a trading preference may include an indication of a first commodity, an indication of a second commodity, a market price for the first commodity and a market price for the second commodity where the market prices are determined by the same exchange. Another example of a trading preference may include an indication of a first commodity, an indication of a second commodity, a market price for the first commodity and a market price for the second commodity where the market prices are determined by different exchanges.

The location of the user, for use as preference information, may be determined though a variety of means. The way in which location is determined may be indicated as a preference. Some examples of determining the location of the user are triangulating signals from a plurality of telecom towers, locating the latitude and longitude of the user by a global positioning system, analyzing a subscription pattern of weather and market content, and examining the user's profile. The user may also enter in the user profile, but is not limited to, an address, a mobile phone number, and an area code.

At 304, the user may enter a function. Functions may include, but are not limited to, farmer/producer, trader, manufacturer, and other. At 305, the user may save the user profile.

Using the example of the sugarcane and pepper farmer, the farmer may setup his profile by calling into the system. The farmer will be prompted to enter in a variety of information about his location, his phone, his function as a farmer, and preferences about his crops.

Figure 4:
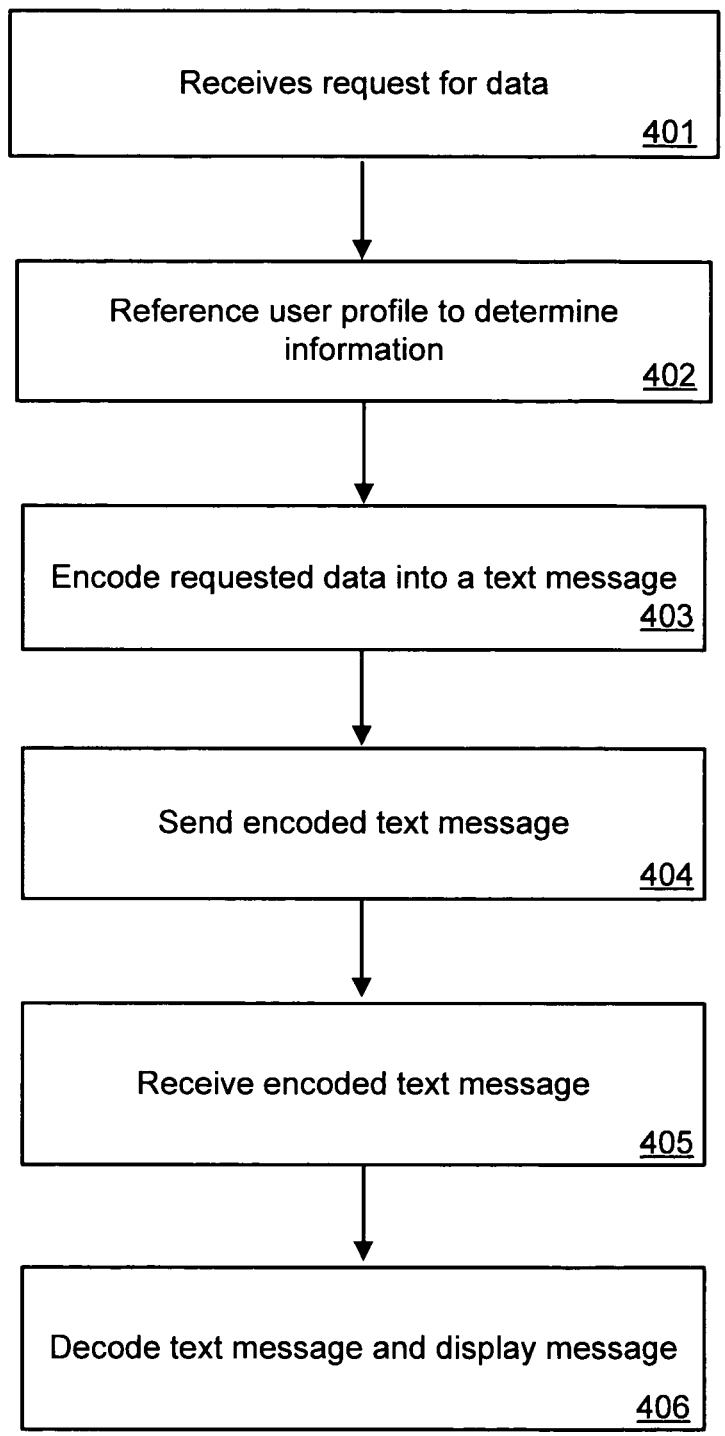
FIG. 4 is a block diagram of a method according to some embodiments.

Referring now to FIG. 4, an embodiment of a method 400 is shown. At 401, a system may receive a request from a user requesting that data be sent to the user's mobile device. The request may be implemented by, but not limited to, a voice message, text message, or voice response system for example a Voice Response Unit ("VRU") or an Interactive Voice Response ("IVR") unit. In one embodiment, the text message request sent from the user's mobile device to the system may be an encoded text message and may be decoded by the system. AT 402, the system may reference user profile information stored in a database to determine the data to be sent to the user. At 403, the data to be sent to the user may be encoded by using encoding tables. The encoding tables may be stored in the database. At 404, the encoded text message is sent to the user. At 405, a mobile device associated with the user receives the encoded text message. At 406, a client application stored on the mobile device may decode the encoded text message. A GUI may display the decoded data in graphical format using icons to represent for example commodities, markets, and weather information.

Figure 5A:
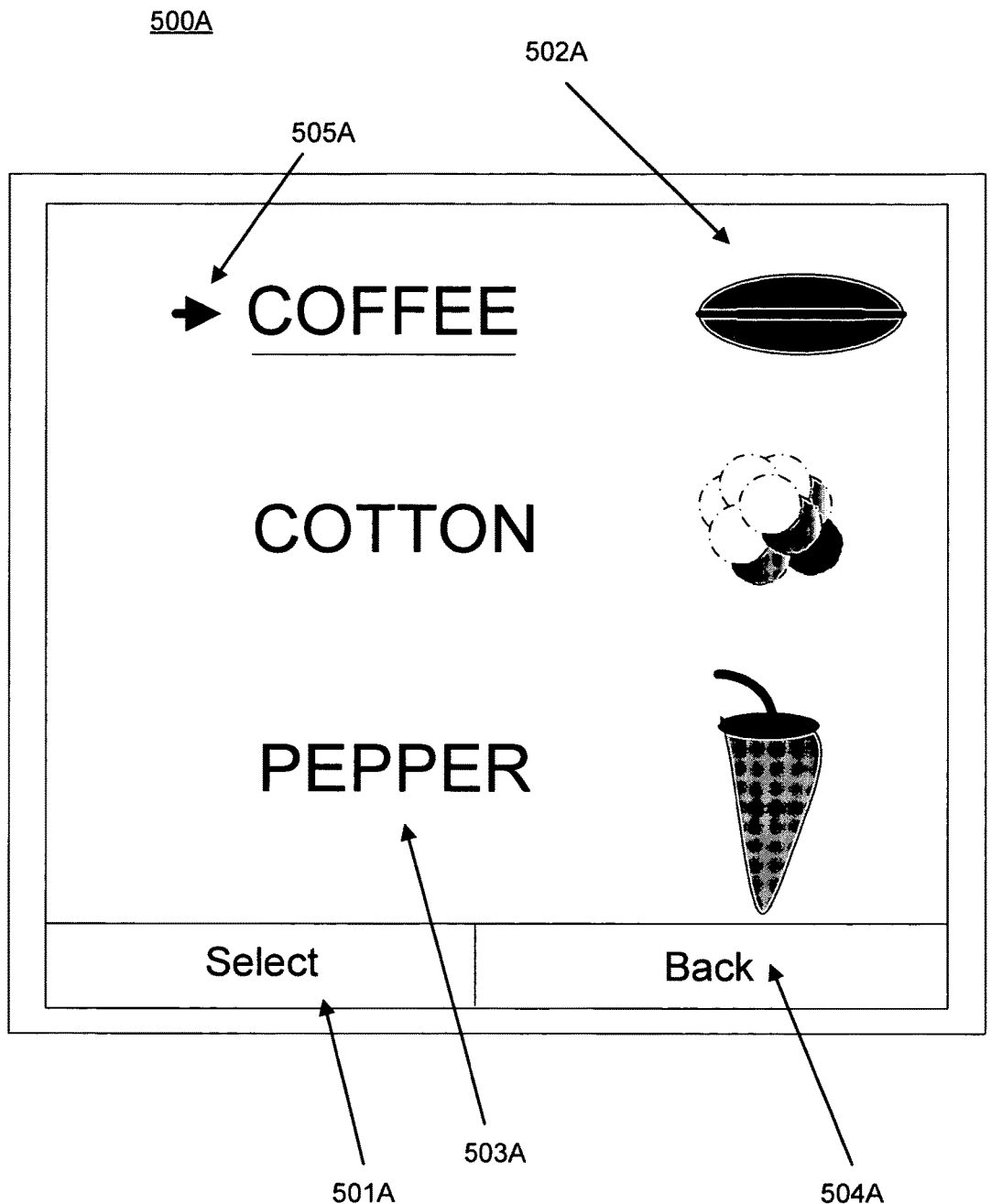
FIG. 5A is a diagram of a display according to some embodiments.

Referring now to FIG. 5A, an embodiment of a first display screen 500A is shown. First display 500A shows a select button 501A, a commodity icon 502A, a commodity name 503A, a back button 504A, and a selection indicator 505A. The commodity icon 502A may graphically represent a commodity. The corresponding commodity name 503A may be displayed within proximity of the commodity icon 502A to aid users in determining the requested commodity. The back button 501A may allow a user to display a previously displayed screen. The select button 501A may determine the requested commodity and the requested commodity may be marked with the selection indicator 505A.

Figure 5B:
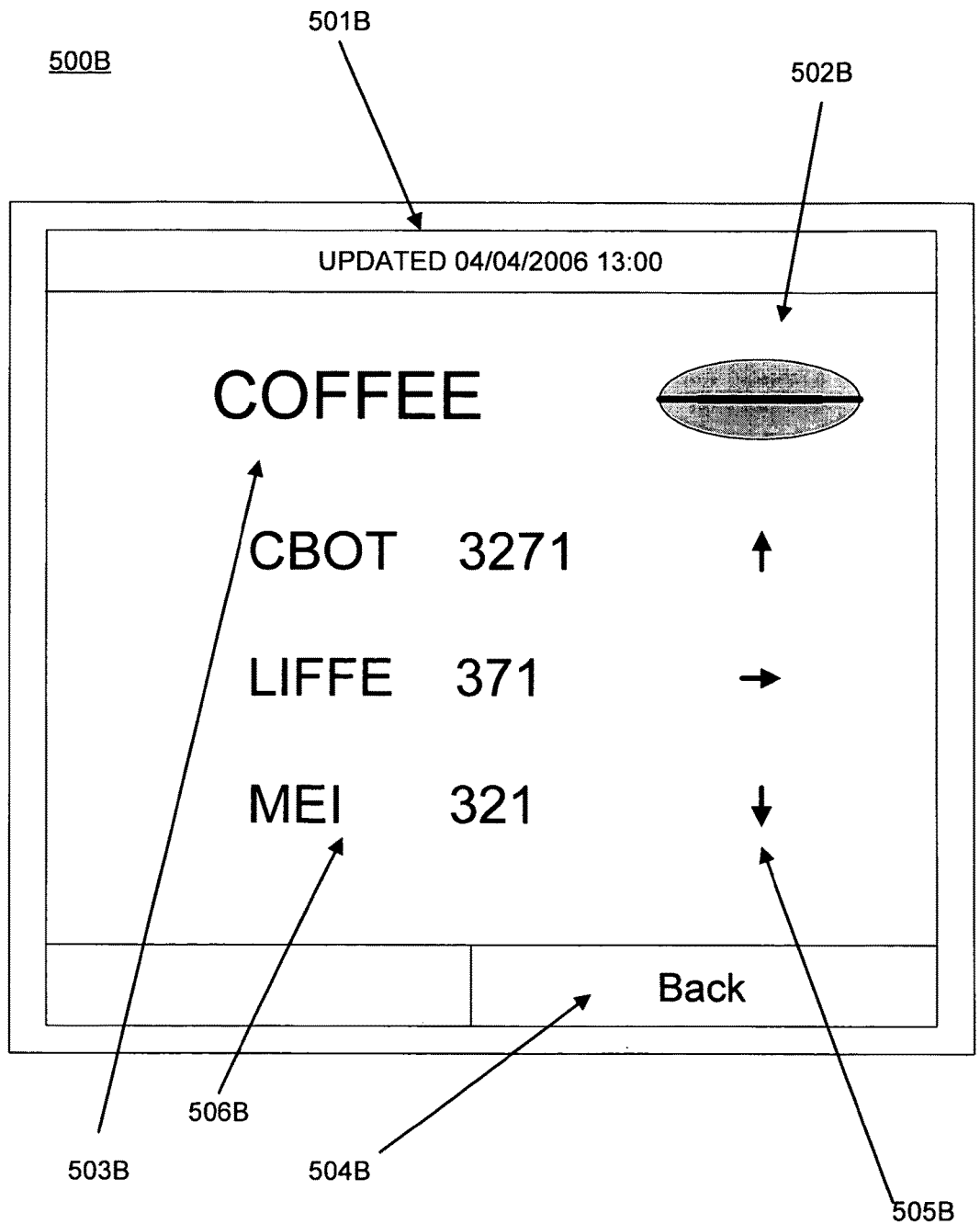
FIG. 5B is a diagram of a display according to some embodiments.

Referring now to FIG. 5B, an embodiment of a second display screen 500B is shown. Second display 500B shows a display update time 501B, a commodity icon 502B, a commodity name 503B, a back button 504B, a market status indicator 505B, and a plurality of exchange and price indicators 506B. The commodity icon 502B may graphically represent a commodity on a display and the corresponding commodity name 503B may be displayed within proximity to the commodity icon 502B to aid users in determining the requested commodity. The plurality of exchange and price indicators 506B list market exchanges selected from a user profile, and a current price of each market at the display update time 501B. The back button 504B may allow a user to display a previously displayed screen.

Figure 5C:
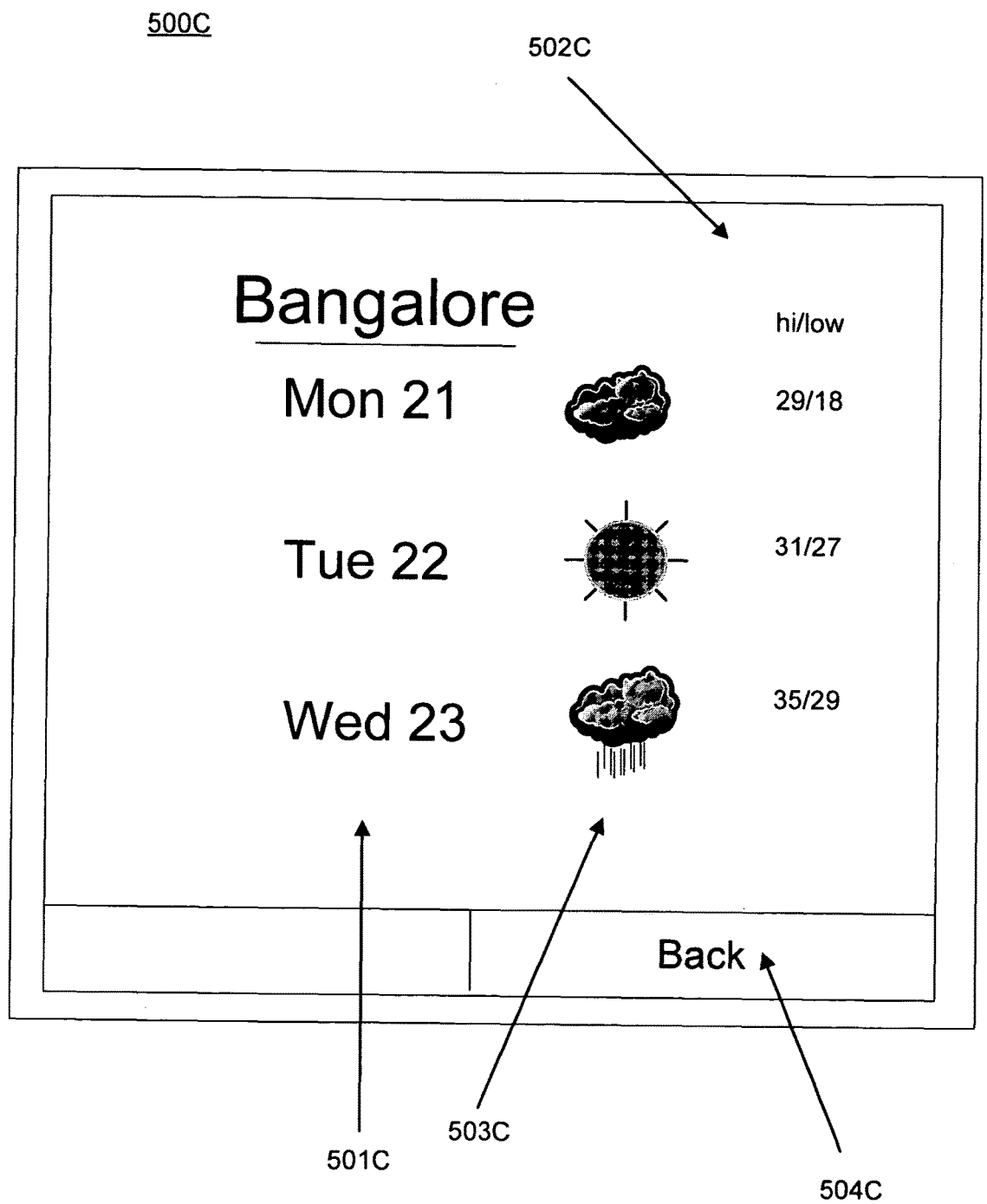
FIG. 5C is a diagram of a display according to some embodiments.

Referring now to FIG. 5C, an embodiment of a third display screen 500C is shown. Third display screen 500C shows a date 501C, a hi/low temperature indicator 502C, a weather icon 503C, and a back button 504C. A plurality of weather icons 503C may be displayed on a single display screen. A GUI may display the weather icon 503C indicating a weather information respective of the date 501C. For example, the application may display a weather icon depicting a forecast of raining, sunny, or cloudy. The application may also display a plurality of hi/low temperature indicators 502C that represent high and low forecasted temperatures respective of the date 501C. The back button 504C may allow a user to display a previously displayed screen.

Figure 6:
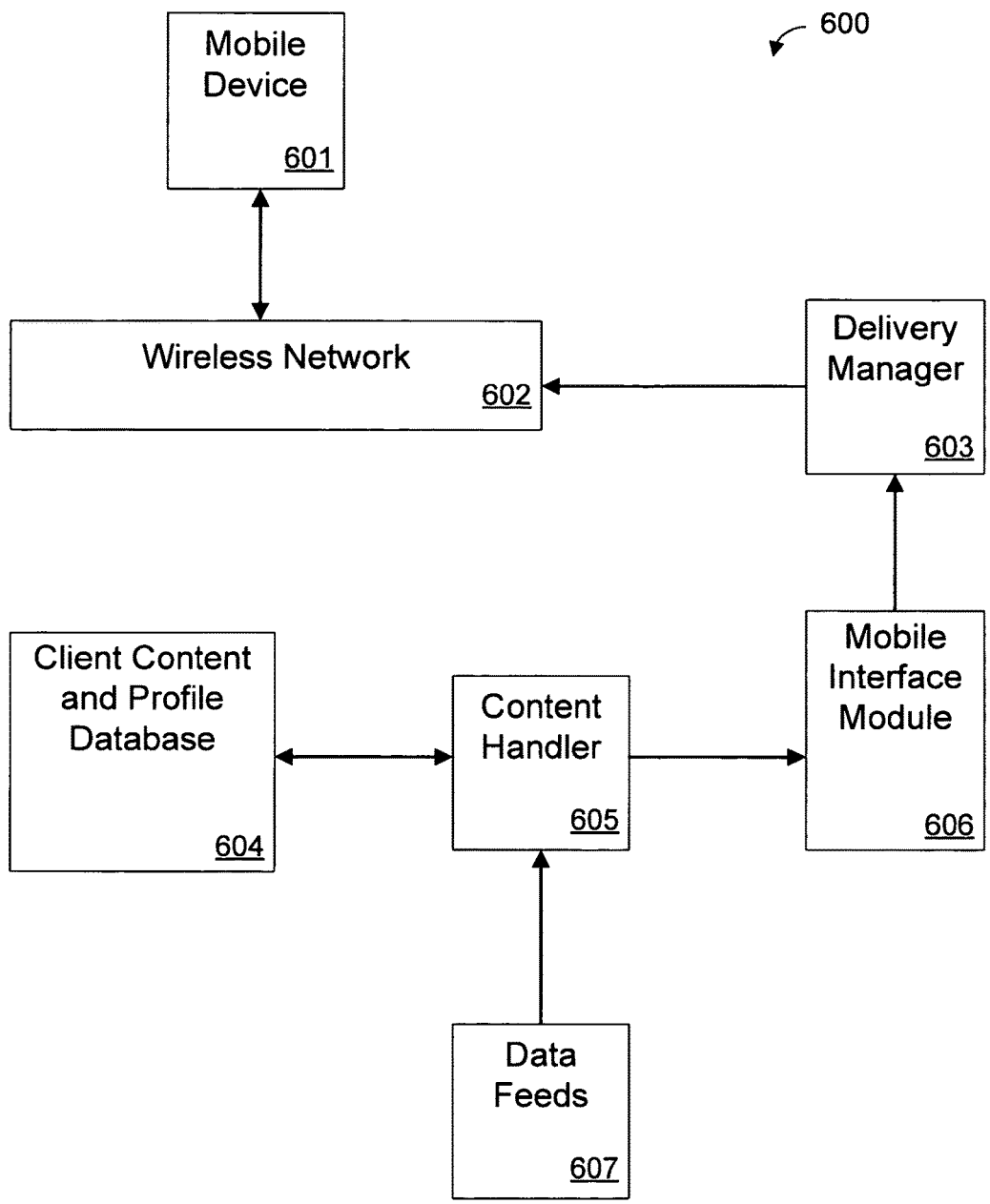
FIG. 6 is a block diagram of a system according to some embodiments.

Referring now to FIG. 6, an embodiment of a system 600 is shown. The system includes a mobile device 601, a wireless network 602, a delivery manager 603, a client content and profile database 604, a content handler 605, a mobile interface module 606, and a plurality of data feeds 607. The content handler 605 may extract incoming data from the plurality of data feeds 607 and may update information stored in the client content and profile database 604. The data feeds 607 may include, but are not limited to, exchanges, weather services, and news services. The mobile interface module 606 may review user profiles stored in the client content and profile database 604 and assemble the data to be delivered to each user based on the preferences within each user's profile. The customized data may be passed to the delivery manager 603 for formatting and delivery to each user. The data may be delivered to a mobile device 601 associated with the user via the wireless network 602. The wireless network 602 may be any available wireless network or telecom system. The mobile device 601 may include, but is not limited to, mobile phones, personal data assistants, and handheld personal computers.

Figure 7:
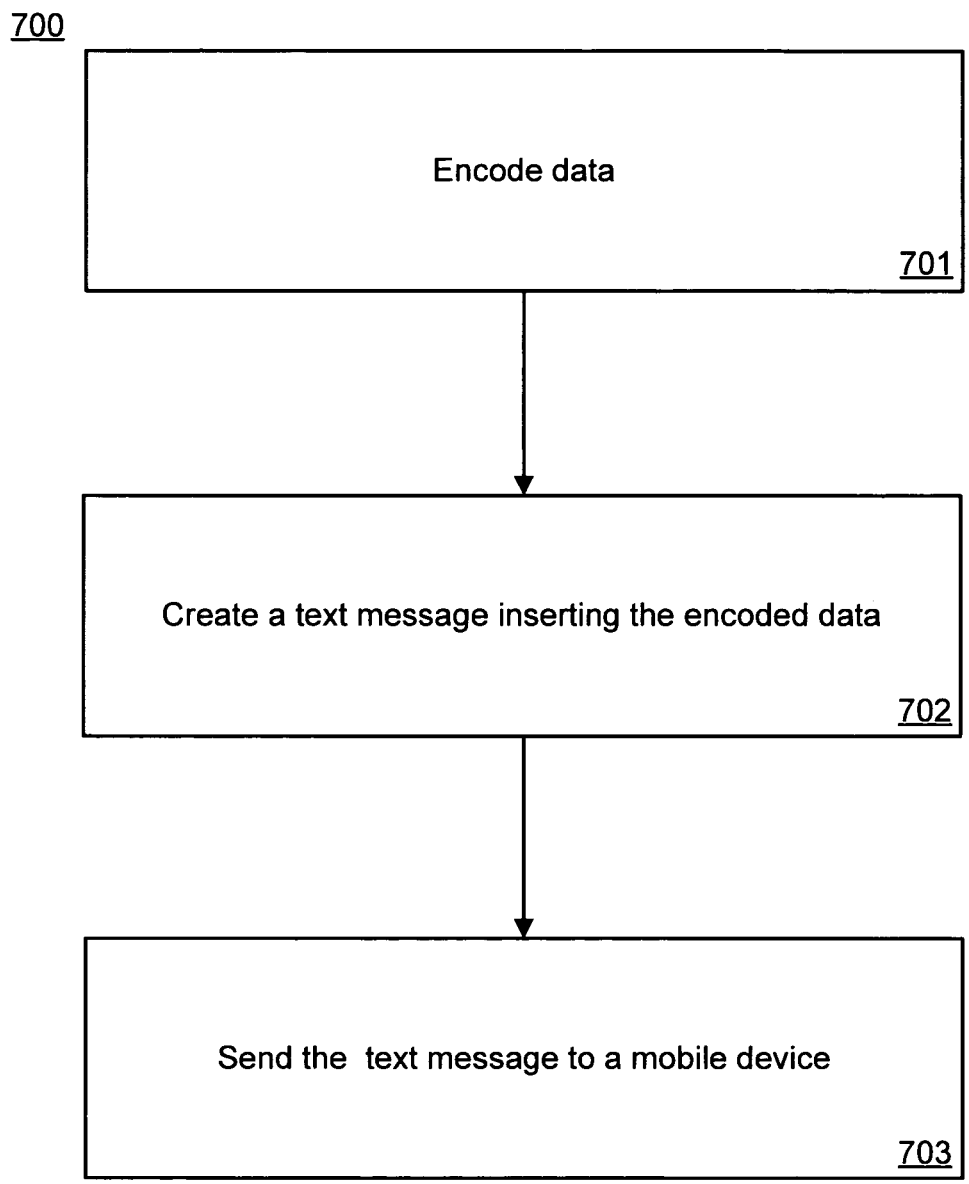
FIG. 7 is a block diagram of a method according to some embodiments.

Referring now to FIG. 7, an embodiment of a method 700 is shown. At 701, data is encoded. The data to be encoded is selected based on preference information associated with a user. The preference information may contain, but is not limited to, one or more commodity trading preferences, local and/or international news, weather information, and a location of the user.

Examples of a commodity trading preference may include an indicated commodity, an indicated exchange, and a market price of the commodity as determined by the indicated exchange. Indications of multiple commodities and/or indications of multiple exchanges or combinations thereof may also be used as a commodity trading preference. For example, a trading preference may include an indication of a first commodity, an indication of a second commodity, a market price for the first commodity and a market price for the second commodity where the market prices are determined by the same exchange. Another example of a trading preference may include an indication of a first commodity, an indication of a second commodity, a market price for the first commodity and a market price for the second commodity where the market prices are determined by different exchanges.

The location of the user, for use as preference information, may be determined through a variety of means. Some examples of determining the location of the user are triangulating signals from a plurality of telecom towers, locating the latitude and longitude of the user by a global positioning system, analyzing a subscription pattern of weather and market content, and examining the user's profile. The user profile may contain, but is not limited to, an address, a mobile phone number, and an area code. The data to be sent in a text message, as determined by the preference information, is encoded by the use of encoding tables. In one embodiment, the encoding tables are stored in a database. However, in other embodiments, the coding tables may be stored in read only memory, software, firmware, or any other storage mechanism.

At 702, the encoded data is inserted into a text message. The encoded data may contain, but is not limited to, an indication of a commodity in a short form, an indication of an exchange in a short form, a market price of the commodity, weather information in a short form, and news. In some embodiments the market price is separated from either the news or weather information by a delimiter. The delimiter may be, but is not limited to, a semicolon, a colon, a comma, a space, and a carrot.

At 703, the text message is sent to a mobile device associated with a user. In one embodiment the encoded data is pushed to the mobile device, however, in other embodiments the encoded data may be pulled from the server based on a request from the mobile device.

Figure 8:
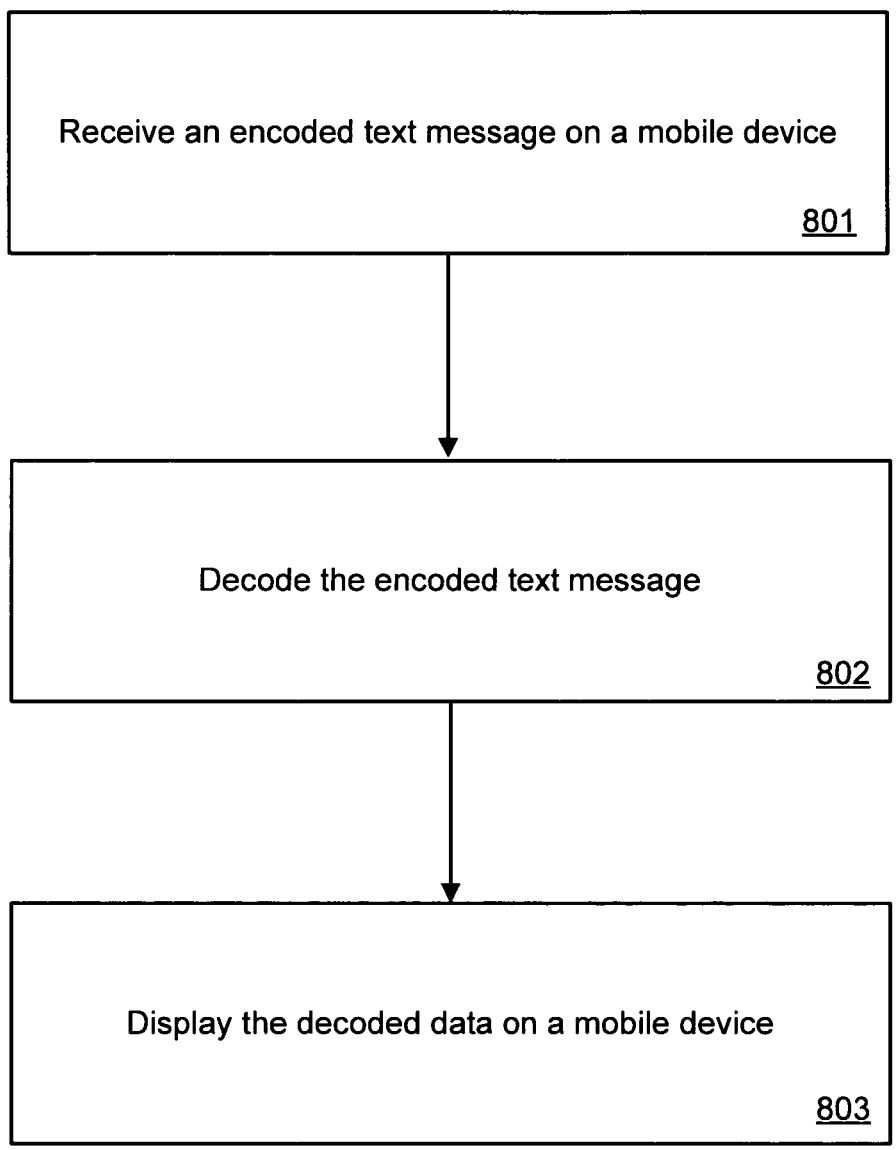
FIG. 8 is a block diagram of a method according to some embodiments.

Referring now to FIG. 8, an embodiment of a method 800 is shown. At 801, a mobile device associated with a user receives an encoded text message. Mobile devices may include, but are not limited to, mobile phones, personal data assistants, and handheld personal computers. At 802, the encoded text message is decoded. A client application stored on the mobile device may decode the encoded text message. At 803, the decoded data is displayed on the mobile device associated with the user. The data may be displayed in the form of a graphical icon. Displaying the data in the form of a graphical icon may provide illiterate people access to the same data as literate people and may also provide people who speak different languages or dialects access to the same information without necessitating a translation. Textual descriptions of the decoded data may also be displayed.

Figure 9:
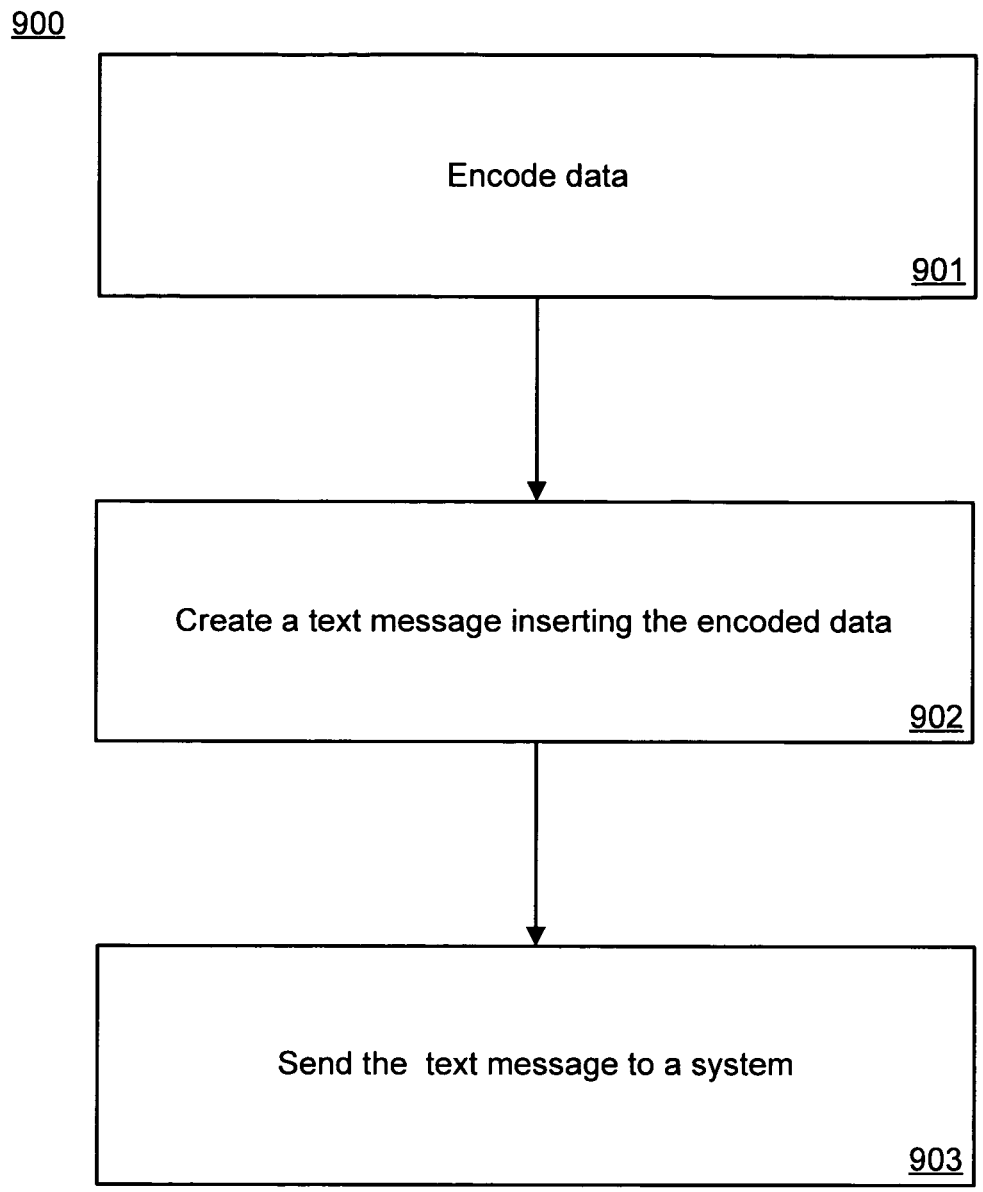
FIG. 9 is a block diagram of a method according to some embodiments.

Referring now to FIG. 9, an embodiment of a method 900 is shown. At 901, data is encoded by a mobile device. The data to be encoded may be preference information associated with a user. Continuing the illustrative example introduced above, where the system is used in conjunction with the trading of commodities, the preference information may contain, but is not limited to, one or more commodity trading preferences and a location of the user (e.g., such as a specific geographic location of the farmer in the example).

In this illustrative example, specific examples of a commodity trading preference may include an indicated commodity, an indicated exchange, and a market price of the commodity as determined by the indicated exchange. Indications of multiple commodities and/or indications of multiple exchanges or combinations thereof may also be used as a commodity trading preference. For example, a trading preference may include an indication of a first commodity, an indication of a second commodity, a market price for the first commodity and a market price for the second commodity.

The data to be sent in a text message is encoded by the use of encoding tables stored on the mobile device. In one embodiment, the encoding tables are stored in a database. However, in other embodiments, the coding tables may be stored in read only memory, software, firmware, or any other storage mechanism.

At 902, the encoded data is inserted into a text message. The encoded data may contain, but is not limited to, an indication of a commodity in a short form, an indication of an exchange in a short form, a market price of the commodity.

At 903, the text message is sent from the mobile device to a server or a second mobile device. In one embodiment the encoded data is pushed from the mobile device to the server, however, in other embodiments the encoded data may be pulled from the mobile device based on a request from the server.

At 904, the server may decode the encoded text message by using encoding tables. In one embodiment, the encoding tables are stored in a database. However, in other embodiments, the coding tables may be stored in read only memory, software, firmware, or any other storage mechanism.

The foregoing disclosure has been described with reference to specific exemplary embodiments thereof. It will, however, be evident that various modifications and changes may be made thereto without departing from the broader spirit and scope set forth in the appended claims.

What is claimed is:

1. A system comprising:
   a processor at a content server, wherein the content server receives a plurality of data feeds containing data; and
   a medium at the content server storing instructions adapted to be executed by the processor to:
   determine a current geographic location of a user based in part on an analysis of a subscription pattern of the user for at least one of weather and market content;
   access preference information associated with the user, wherein the preference information of the user is stored in a profile database at the content server that is remote from a mobile device associated with the user, and further wherein the preference information of the user includes commodity trading preferences of the user including an indication of a commodity, an indication of an exchange, a location of the user, and a market price for the commodity, wherein the market price is determined by the exchange;
   select, by the processor, a portion of the data from the received plurality of data feeds for the user based on (1) the preference information associated with the user and (2) the location of the user, wherein the selected data comprises a first data item including a first plurality of textual characters and a second data item including a second plurality of textual characters;
   encode the selected data in textual characters of a short message service (SMS) text message using one or more encoding tables containing unique short form information values associated with at least one data item of the selected data, wherein each of the unique short form information values consists of a single textual character; and
   send the encoded SMS text message solely via a cellular wireless network to the mobile device of the user, wherein the encoded SMS text message comprises the unique short form information values associated with the selected data and wherein the encoded SMS text message comprises the first data item concatenated with the second data item without any delimiter between the first data item and the second data item, wherein the SMS text message can be received by the mobile device via the cellular network, and the textual characters of the received SMS text message can be parsed and decoded by the mobile device to display the selected data as user-readable information, the user-readable information being in at least one of a graphical and textual form.

2. The system of claim 1, wherein the first and second data items contain at least an indication of a commodity in a short form, an indication of an exchange in a short form, and a market price of the commodity.

3. The system of claim 1, wherein the location is determined by analyzing a subscription pattern of weather and market content.

4. The system of claim 1, wherein the commodity trading preferences further include:
   an indication of a second commodity; and
   a second market price of the second commodity,
   wherein the second market price is determined by the exchange.

5. The system of claim 4, wherein the commodity trading preferences further include:
   a second market price for the commodity, wherein the second market price is determined by a second exchange.

6. The system of claim 1, wherein the data contains at least one of a news headline and weather information selected at least in part based on the preferences information.

7. The system of claim 1, further comprising:
a second processor at the mobile device that is unconnected for data transmission and is connected for exchange of SMS text messages; and
a second medium at the mobile device server storing instructions adapted to be executed by the second processor to display the user-readable information in a first display screen that includes a selectable, graphical icon associated with at least one of the first and second data items.

8. The system of claim 7, wherein user selection of the graphical icon associated with the first data item causes the first processor to execute the instructions stored by the first medium to generate a second display screen of user-readable information associated with the first data item, the second display screen including additional information relative to the first display screen, the additional information being based on the received encoded SMS text message.

9. The system of claim 7, wherein the selected data comprises a third data item including a third plurality of textual characters, and the SMS text message is generated to further include the third plurality of textual characters of the third data item, so that only a portion of the textual characters included in the SMS text message are an encoded using the one or more encoding tables.

10. The system of claim 7, wherein the second medium further stores instructions adapted to be executed by second processor of the mobile device to send to the content server an SMS text message that includes at least a portion of the preference information.

11. A method comprising:
determining a current geographic location of a user based in part on an analysis of a subscription pattern of the user with at least one of weather and market content;
receiving, at a processor at a content server, a plurality of data streams containing data;
accessing, at the processor, preference information associated with a user, the preference information of the user including commodity trading preferences of the user comprising: (1) an indication of a commodity, (2) an indication of an exchange, (3) the location of the user; and (4) a market price for the commodity, wherein the market price is determined by the exchange;
storing the preference information into a profile database at the content server;
automatically selecting, by the processor, data for a user based on (1) preference information associated with the user and (2) the location of the user, the preference information being retrieved from the profile database, the selected data comprising a first data item including a first plurality of textual characters and a second data item including a second plurality of textual characters;
encoding, by the processor, the selected data in textual characters of a short message service (SMS) text message using one or more encoding tables containing unique short form information values associated with at least one data item of the selected data, wherein the encoded data comprises at least the first data item and the second data item, the first and the second data items containing at least an indication of a commodity in a short form, an indication of an exchange in a short form, and a market price of the commodity and wherein each of the unique short form information values consists of a single data character; and
sending the SMS text message solely via a cellular network to a remote mobile device associated with the user,
wherein the encoded SMS text message comprises the unique short form information values associated with the selected data, wherein the encoded SMS text message comprises the first data item concatenated with the second data item without any delimiter between the first data item and the second data item;
receiving, at the mobile device, the encoded SMS text message via the cellular network in the mobile device;
parsing, at the mobile device, the textual characters of the encoded SMS text message;
decoding, at the mobile device, the parsed textual characters of the SMS text message;
displaying, at the mobile device, a first display screen that includes user-readable information which is based on the decoded textual characters of the SMS text message, the user-readable information being in at least one of a graphical and textual form.

12. The method of claim 11, wherein the text message is one of a short message service text message and an unstructured supplementary service data message.

13. The method of claim 11, wherein the location is determined by locating the latitude and longitude of the user by a global positioning system.

14. The method of claim 11, wherein the commodity trading preferences further include:
an indication of a second commodity; and
a second market price of the second commodity,
wherein the second market price is determined by the exchange.

15. The method of claim 14, wherein the commodity trading preferences further include:
a second market price for the commodity, wherein the second market price is determined by a second exchange.

16. The method of claim 11, wherein the first and second data items further contain at least one of a news headline and weather information.

17. The method of claim 11, wherein the user-readable information includes a selectable, graphical icon associated with at least one of the first and second data items.

18. The method of claim 17, further comprising generating, at the mobile device, in response to user selection of the graphical icon associated with the first data item, a second display screen of user-readable information associated with the first data item, the second display screen including additional information relative to the first display screen, the additional information being based on the received encoded SMS text message.

19. The method of claim 17, wherein the selected data comprises a third data item including a third plurality of textual characters, and the SMS text message is generated to further include the third plurality of textual characters of the third data item, so that only a portion of the textual characters included in the SMS text message are an encoded using the one or more encoding tables.

20. The method of claim 17, further comprising sending, by the mobile device to the content server, an SMS text message that includes at least a portion of the preference information.

* * * * *